United States Patent [19]

Howe et al.

[11] 4,150,880
[45] Apr. 24, 1979

[54] OPTICAL ACHROMATIZATION FOR ACOUSTOOPTIC DEFLECTORS

[75] Inventors: Dennis G. Howe, Fairport; Richard N. Blazey, Rochester; James C. Owens, Pittsford, all of N.Y.

[73] Assignee: Eastman Kodak Company, Rochester, N.Y.

[21] Appl. No.: 806,205

[22] Filed: Jun. 13, 1977

[51] Int. Cl.² ............................................. G02F 1/33
[52] U.S. Cl. .................................... 350/358; 350/168
[58] Field of Search .................. 331/94.5 M; 332/7.51; 350/358, 168

[56] References Cited

PUBLICATIONS

Watson et al., Equalization of Acoustooptic Deflection Cells in a Laser Color TV System, Appl. Optics, vol. 9, No. 5 (May 1970), pp. 1176–1177.

*Primary Examiner*—William L. Sikes
*Attorney, Agent, or Firm*—Warren W. Kurz

[57] ABSTRACT

An acoustooptic deflection cell diffracts a multi-color beam into a plurality of different mono-color beams of distinct scan angles. An optical system intercepts the diffracted light beams, equalizes the different scan angles and realigns the beams to register at an image plane. Equalization of the scan angles may be accomplished by a prism system, while realignment may be done with a mirror system.

9 Claims, 7 Drawing Figures

U.S. Patent    Apr. 24, 1979    Sheet 1 of 4    4,150,880
FIG. 1
(PRIOR ART)
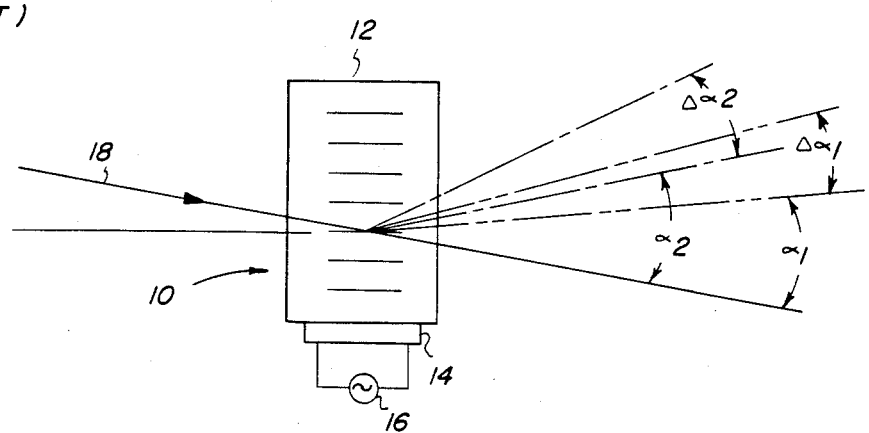
FIG. 2
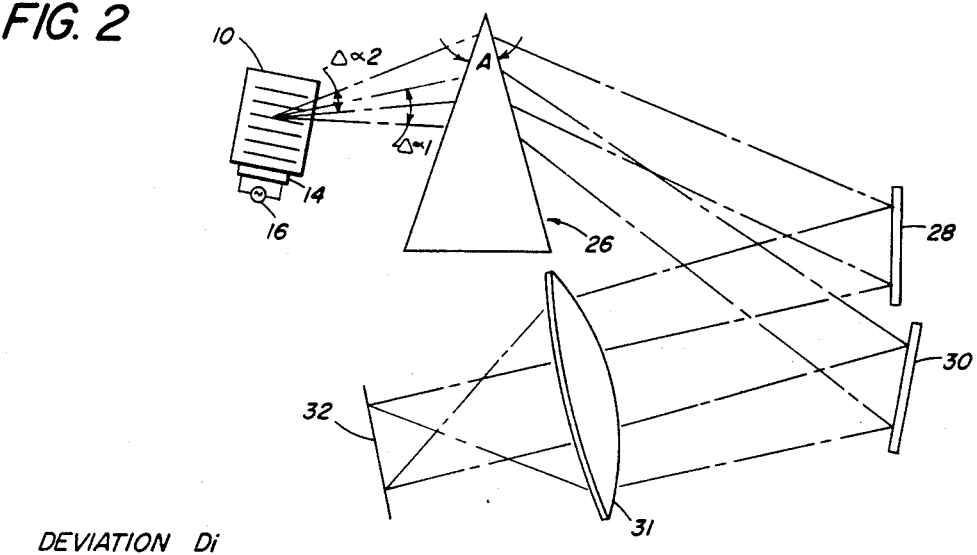
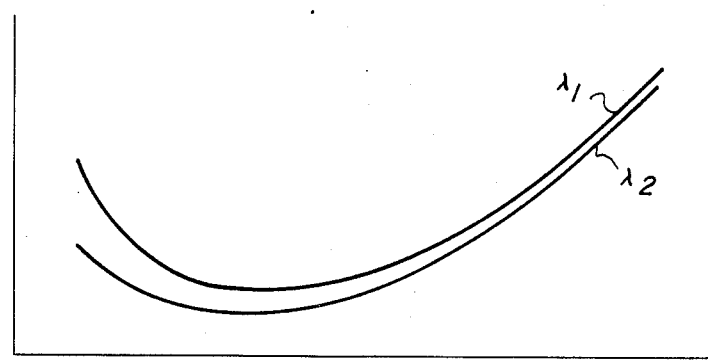
FIG. 3

OPTICAL ACHROMATIZATION FOR ACOUSTOOPTIC DEFLECTORS

BACKGROUND OF THE INVENTION

1. Field of the Invention

This invention relates to acoustooptic light deflection systems, and more particularly to apparatus for deflecting two or more beams of light of different wavelength through substantially the same scan angle.

2. Description of the Prior Art

It is well known that the passage of acoustic waves through a transparent medium produces a diffraction grating by periodic variation of the index of refraction of the medium. Light directed through the medium, or cell, is diffracted through an angle such that the angle between the undiffracted and diffracted beams is $\alpha$, where:

$$\alpha \approx \lambda f / v \quad (1)$$

for small values of $\alpha$ and where $\lambda$ is the wavelength of the illuminating light, f is the frequency of the acoustic wave, and v is the acoustic velocity.

It can be seen that for a given frequency f equation (1) defines a different angle $\alpha$ for each wavelength making up a multi-color light beam. Thus, for polychromatic beams, each different wavelength component will be diffracted at an angle which differs from that of any other component. If frequency f is continuously varied through a bandwidth $\Delta f$, each component of the light beam will scan through a unique scan angle $\Delta \alpha$ given by $$\Delta \alpha = \lambda \Delta f / v \quad (2)$$

This situation has been summarized in FIG. 1, wherein a conventional diffraction cell 10 contains acoustic waves 12 of frequency $f_1$ produced by a transducer 14, which is in turn energized by a signal source 16. A light beam 18 having two wavelength components $\lambda_1$ and $\lambda_2$ ($\lambda_2 > \lambda_1$) enters the cell and is diffracted by the acoustic wavefronts. Since the angle of diffraction is a function of optical wavelength, the light of each wavelength exits at a different respective diffraction angle.

If the frequency of acoustic waves 12 was changed from $f_1$ to a higher frequency $f_2$, the diffraction angles would change in accordance with equation (2) by $\Delta \alpha_1$ and $\Delta \alpha_2$, respectively, $\Delta \alpha_2 > \Delta \alpha_1$. Thus, it is apparent that, even if the diffraction paths of the two wavelengths could be made co-linear at one chosen frequency such as for example by impinging beams of different wavelengths at different respective incident angles, they would not remain co-linear as the frequency was varied.

Further, it may be appreciated from FIG. 1, that the smaller the difference in wavelength between $\lambda_1$ and $\lambda_2$, the smaller the difference between the diffraction angles $\alpha_1$ and $\alpha_2$ for a given frequency f. For conventional acoustooptic cells, the difference between the diffraction angles of a beam of red light (e.g. 6300 Å) and a beam of blue light (e.g. 4400 Å) is less than 0.5°. Thus, when it is desired to sweep the beams through a scan angle greater than 0.5°, the scan angle for the blue beam will begin to overlap the scan angle of the red beam. For many applications, it is desirable to sweep the light beams emerging from the acoustic cell through a scan angle of at least 3°. Thus, for the above example, the scan angle of the blue beam will overlap the scan angle of the red beam by 2.5°.

In co-assigned U.S. Pat. No. 3,783,185, which issued Jan. 1, 1974, to R. A. Spaulding, an optical system was disclosed for scanning a composite output beam made up of a light of a plurality of optical wavelengths horizontally across a constantly advancing web of photographic paper. One of the horizontal scanning systems of that disclosure includes a rotating mirror which reflects the composite beam and sweeps it across the web. In many printer applications, such beam scanning might be done with acoustooptic deflection cells, and in such event, some method for compensating for the dispersive characteristics of deflection is necessary when polychromatic light is to be deflected.

In their article "Equalization of Acoustooptic Deflection Cells in a Laser Color TV System", *Applied Optics*, Vol. 9, No. 5, May 1970, W. H. Watson and A. Korpel recognized that the dispersive characteristics of acoustooptic deflection mandates some form of electrical or optical compensation before three primary color images will remain in register as the acoustic frequency is varied over a bandwidth $\Delta f$. They effect such compensation optically by using separate compensating prisms to magnify the smaller blue and green deflection angles to match that of the red beam. This approach requires that the individual beams be spatially separated and, to produce such spatially separated beams, Watson and Korpel use three separate acoustooptic deflectors which are driven by the same signal.

SUMMARY OF THE INVENTION

In accordance with the present invention, an optical system is provided which enables the use of a single deflector cell for scanning a plurality of wavelengths through substantially equal angles to facilitate registration of the wavelengths at an image plane. The optical system corrects for the intrinsic dispersion of the single acoustooptic cell by changing (such as for example by magnifying) the scan angle of the diffracted light of each optical wavelength by an extent necessary to render the scan angles of all wavelengths of light equal. Specifically, according to a preferred embodiment of the invention, a prism is predeterminedly configured and positioned to intercept the deflected beams and provide a different corrective scan angle magnification for each optical wavelength. Additionally, the prism acts to spatially separate the beams to allow an optical system to act on the individual beams to focus them at a common point in a predetermined image plane.

The invention, and its objects and advantages, will become more apparent in the detailed description of the preferred embodiment presented below.

BRIEF DESCRIPTION OF THE DRAWINGS

In the detailed description of the preferred embodiment of the invention presented below, reference is made to the accompanying drawings in which:

FIG. 1 is a schematic representation of a generalized diffraction cell in accordance with the prior art;

FIG. 2 is a schematic view of an optical achromatization system according to a preferred embodiment of the present invention;

FIG. 3 is a plot of light deviation of a prism vs. the incident angle;

DESCRIPTION OF THE PREFERRED EMBODIMENTS

Figure 4:
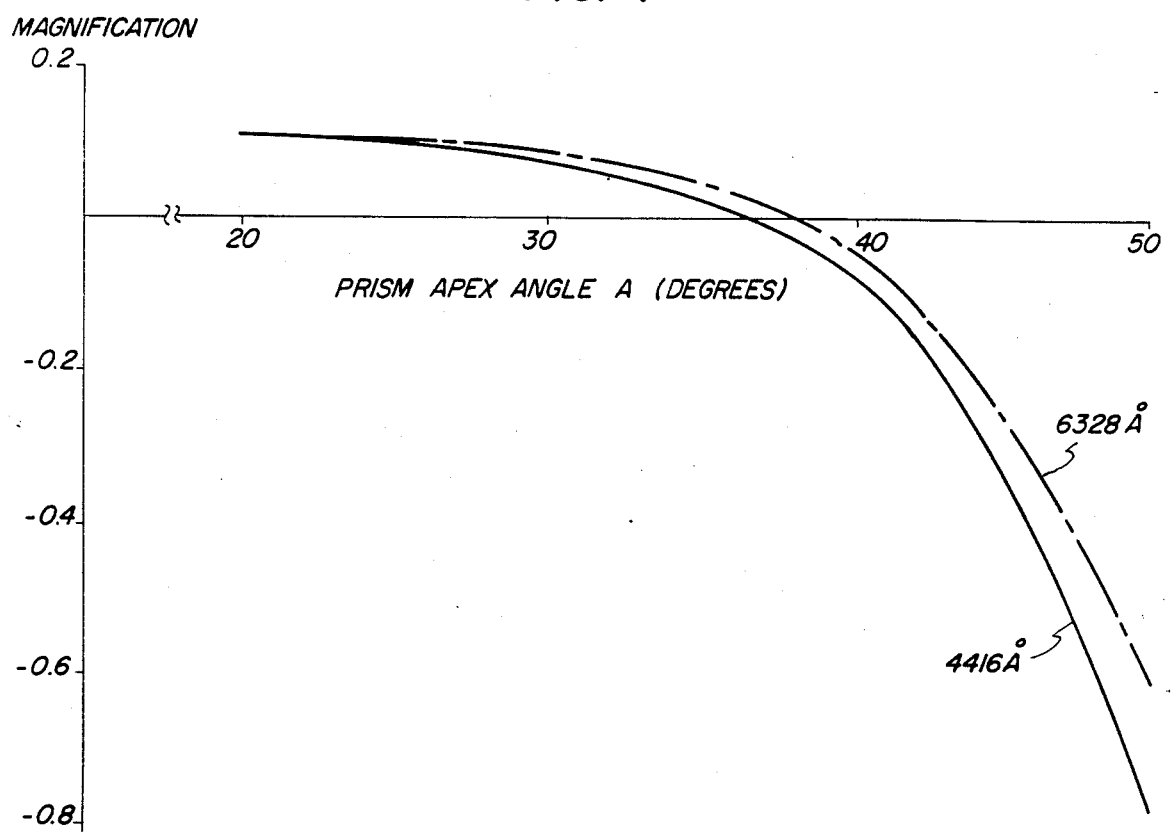
FIG. 4 is a plot of scan angle magnification of a prism vs. prism apex angle.

Referring to FIG. 2, a schematic representation of a polychromatic light deflector system, constructed in accordance with the present invention, is shown. Body 10 is the diffraction cell and is identical to that shown in FIG. 1, the same reference numerals being used in FIG. 2 as were used in FIG. 1 for identical features. A scan-correcting prism 26 has been inserted in the path of the deflected beams to spatially separate the beams, as well as to differentially magnify and thus equalize the scan angles of the different wavelength light. A pair of centering mirrors 28 and 30 is provided to realign the spatially separated beams so that all rays impinging upon an imaging lens 31 at any instant are focused at the same point at an image plane 32. The point at which the beams are focused depends upon the incident lens angle and therefore the scan angle.

Prism 26 has certain parameters selected in accordance with the present invention such that the scan angle $\Delta \alpha$ of each optical wavelength will be changed (magnified) by an amount necessary to make every scan angle equal. In following sections of this specification, we will discuss those parameters which effect scan angle magnification and how such parameters may be used to achromatize the beams.

Scan Magnification

The angle between the path of the incident and emergent rays of a light beam passing through a prism is the angle of deviation D. The amount of deviation of monochromatic light is dependent upon the index of refraction n of the prism material, the apex angle A of the prism and the incident angle $\Theta$ (the angle between the incident light beam and the normal to the incident prism face). The relationship between these parameters is:

$$D = \Theta - A + \sin^{-1}[(n^2 - \sin^2 \Theta)^{\frac{1}{2}} \sin A - \cos A \sin \Theta] \quad (3)$$

From equation (3), it is seen that, for a given prism (fixed index n and apex angle A), deviation of a monochromatic light beam is a function solely of the incident angle $\Theta$. FIG. 3 is a typical plot for two different optical wavelengths $\lambda_1$ and $\lambda_2$ of deviation versus incident angle. Note that as the angle of incidence is, say, decreased from a large value (moving from right to left on the abscissa), the angle of deviation decreases at first and then increases. The angle of minimum deviation $D_m$ is related to the apex angle of the prism and its index of refraction as discussed in *University Physics*, 2nd Edition, Sears and Zemansky, Addison-Wesley Publishing Company, page 736.

While FIG. 3 shows the change in deviation with incident angle, the magnification M of the prism at any value of incident angle $\Theta$ is related to the slope $dD/d\Theta$ at the value of $\Theta$ by the equation $M = dD/d\Theta$.

Of course, the change in incident angle $\Delta \Theta$ of a beam arriving at a prism face from an acoustooptic deflector cell as in FIG. 2 is linearly related to the change $\Delta \alpha$ in the diffraction angle of the cell. As mentioned hereinbefore, the scan angles $\Delta \alpha_1, \Delta \alpha_2, \ldots, \Delta \alpha_n$ corresponding to light of wavelengths $\lambda_1, \lambda_2, \ldots, \lambda_n$ are directly proportional to wavelengths; see equation (2). Mathematically, such a relationship can be expressed as follows:

$$\Delta \alpha_1 / \lambda_1 = \Delta \alpha_2 / \lambda_2 = \ldots = \Delta \alpha_n / \lambda_n$$

Accordingly, if the scan angles $\Delta \alpha_i$ (where i is any integer) were multiplied by a factor $M_i$ which was constant over the scan angle $\Delta \alpha_i$ and inversely proportional to the associated optical wavelength, the resulting scan angles would all be the same. Another way to express the same relationship is:

$$\Delta \alpha_1 M_1 = \Delta \alpha_2 M_2 = \ldots = \Delta \alpha_n M_n$$

where $M_i = M_1, M_2, \ldots, M_n$, and $M_i = \text{constant}/\lambda_i$.

Referring to FIG. 3 it can be seen that a prism is one device wherein magnification can be inversely proportional to the wavelength. That is, the prism magnification M can be greater for shorter optical wavelengths. In the region to the left of the point of minimum deviation in FIG. 3, the slope for the shorter wavelength $\lambda_1$ is more negative than that for the longer wavelength $\lambda_2$. Thus, in that region, the desired relationship ($M_i = \text{constant}/\lambda_i$) holds if proper prism parameters, (i.e., index of refraction, apex angle and incident angle) are chosen, and hence equalization of scan angles for different wavelengths can be obtained.

Selection of Apex Angle

Deviation as a function of the apex angle can be computed from equation (3) for a given prism material and a fixed incident angle $\Theta$. In FIG. 4, we have shown how magnifications ($dD/d\Theta$) vary as a function of apex angle for red and blue light beams (respective wavelengths of 6328 Å and 4416 Å) in a typical situation, using a prism of SF-8 (trademark of the Bourns Optical Glass Co. of Riverside, Calif.) glass operated at a fixed incident angle $\Theta = 35°$.

For large apex angles, the absolute magnitude of the scan angle magnification increases as wavelength decreases, a desirable effect to compensate for the differences in scan angles $\Delta \alpha_i$ from acoustooptic cell 10. Thus, in order to obtain prism magnifications that are inversely proportional to a wide range of optical wavelengths, we must choose relatively large prism apex angles.

However, as the apex angle gets larger, that maximum angle will eventually be reached at which the blue beam (which undergoes the largest deviation) is totally internally reflected. Therefore, the chosen apex angle cannot be so large that any light beam will suffer total internal reflection within the prism. For the FIG. 4 example, a practical range of prism apex angles is approximately from 40° to 50°.

Incidence Angle for Two Color Scan Equalization

Once a prism apex angle is chosen, the relative magnification can be adjusted to the desired value by choosing the appropriate mean angle of incident $\Theta_o$ for a deflection angle which is midway in the scan angle range $\Delta \Theta$. This amounts to determination of the orientation of the prism incident surface relative to the direction of propagation of the acoustic waves in the acoustooptic cell.

Figure 5:
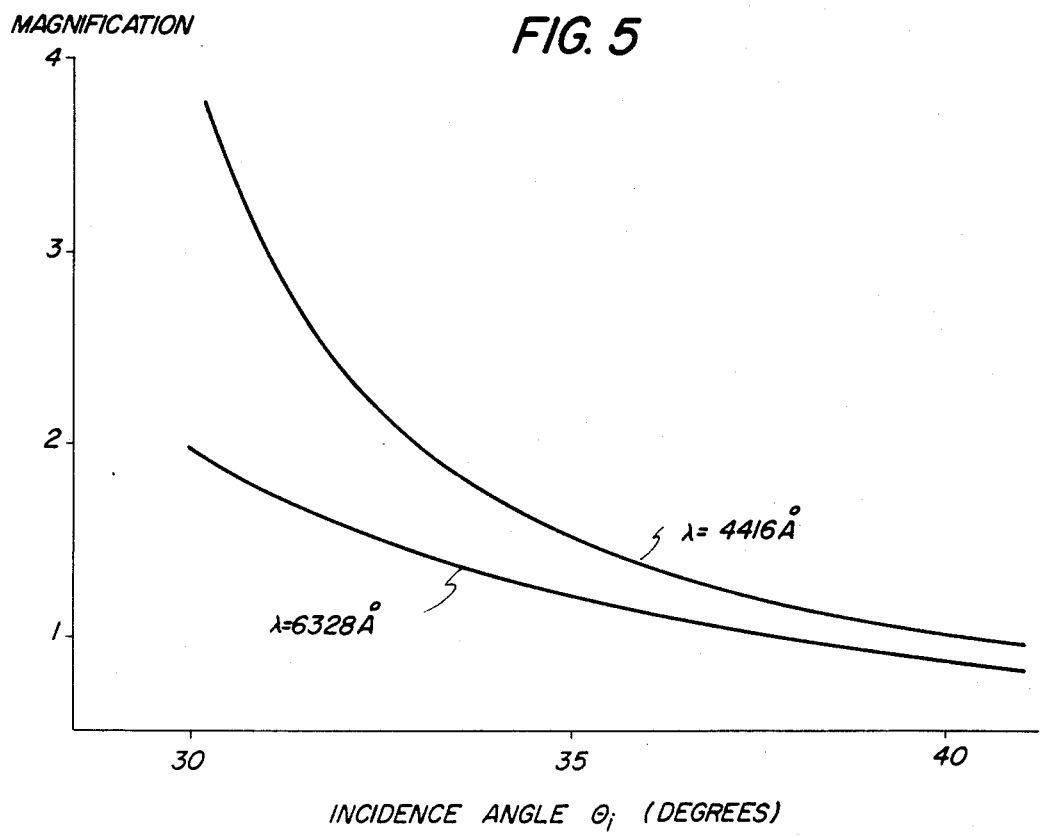
FIG. 5 is a plot of scan angle magnification of a prism vs. the incident angle.

In FIG. 5, we have shown a pair of theoretically obtained plots of magnification versus incident angle for a 40° apex angle prism of EK-911 (Trademark of Eastman Kodak Company) glass. From the plots, it can be shown that at $\Theta_i = 32°$, $M_i = \text{constant}/\lambda_i$ for the red (6328 Å) and blue (4416 Å) lines for such a prism. Thus there is an incident angle whereat the magnification will be inversely proportional to the optical wavelengths 6328 Å and 4416 Å for that particular prism.

In determining the mean incident angle at which the desired relationship between magnification and wavelength exists, we shall define $R_{ij} \equiv M_i/M_j$, where i and j are integers. If only two colors $\lambda_1$ and $\lambda_3$ are to be deflected, the desired relationship that the scan angles $\Delta\alpha_1$ and $\Delta\alpha_3$ be multiplied by factors $M_1$ and $M_3$, respectively, which are inversely proportional to the associated optical wavelengths $\lambda_1$ and $\lambda_3$ ($M_i = \text{constant}/\lambda_i$) requires that $M_1\lambda_1 = M_3\lambda_3$, or $R_{13} = \lambda_3/\lambda_1$.

Consider the three wavelengths $\lambda_1 = 6328$ Å, $\lambda_2 = 5210$ Å and $\lambda_3 = 4416$ Å. For the pair $\lambda_1$ and $\lambda_3$, or the pair $\lambda_2$ and $\lambda_3$, respectively we require that:

$$R_{13} = M_1/M_3 = \lambda_3/\lambda_1 = 0.6979, \text{ and} \quad (6)$$

$$R_{23} = M_2/M_3 = \lambda_3/\lambda_2 = 0.8476 \quad (7)$$

Figure 6:
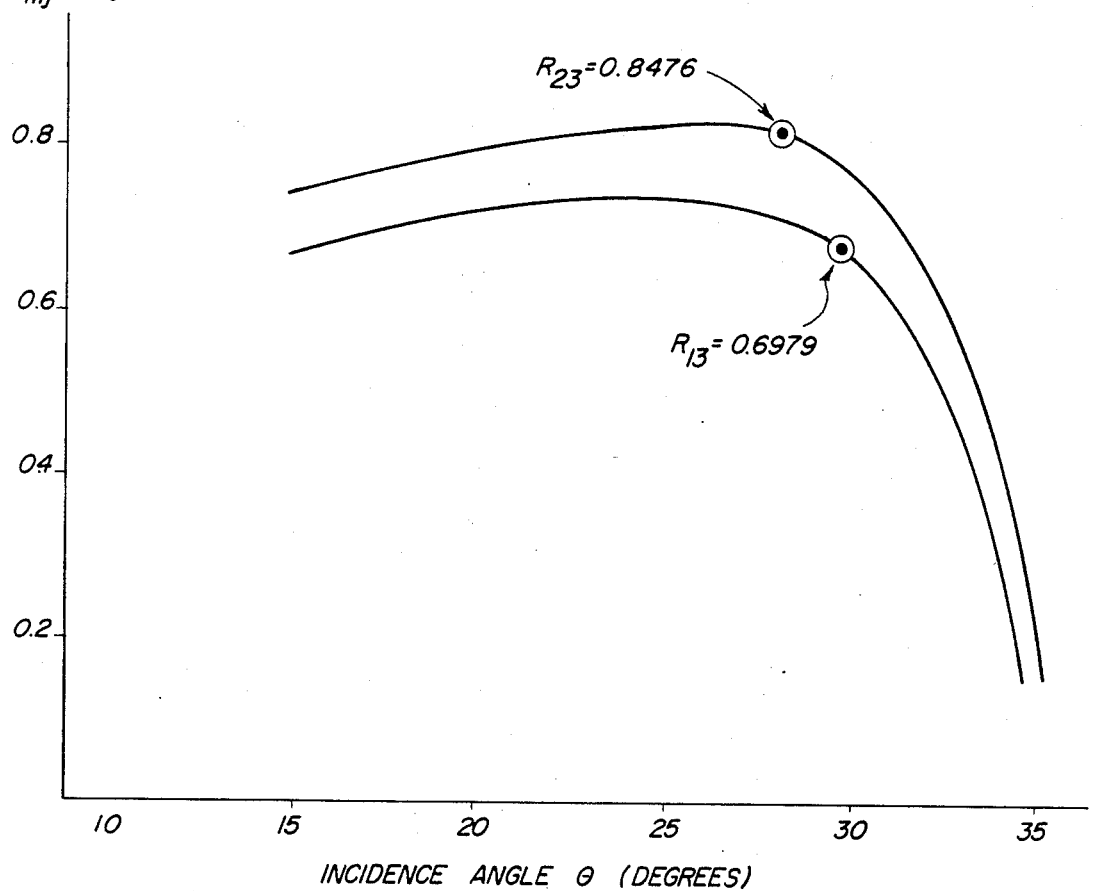
FIG. 6 is a plot of the magnification ratios of two optical wavelengths in a prism vs. the incident angle.

In FIG. 6, computed magnification ratios $M_i/M_j$, or $R_{ij}$, are plotted vs. prism incidence angle $\Theta$ for an EK-911 glass prism with 30° apex angle for the three optical wavelengths $\lambda_1 = 6328$ Å, $\lambda_2 = 5210$ Å and $\lambda_3 = 4416$ Å. The circled points indicate those incidence angles at which the condition of either equation (6) or (7) is fulfilled, i.e., where $R_{ij} = \lambda_i/\lambda_j$ ($R_{13} = 0.6979$ and $R_{23} = 0.8476$). Thus, if one uses this prism at a mean incidence angle of 29.6°, scan equalization can be achieved for the two colors $\lambda_3 = 4416$ Å and $\lambda_1 = 6328$ Å. Similarly, achromatization of the scans of the two colors $\lambda_2 = 5210$ Å and $\lambda_3 = 4416$ Å is achieved by choosing $\Theta = 28.0°$. Of course, as the deflection angle $\alpha$ varies over a range $\Delta\alpha$, the incidence angle $\Theta$ will vary over a corresponding range $\Delta\Theta$, and optimum performance will result if the change in $R_{ij}$ in FIG. 6 is as small as possible over the range $\Delta\Theta$. Two color achromatization holds over a larger scan range $\Delta\alpha$ in the case of the upper curve since the slope of that curve at $\Theta = 28.0°$ is smaller than the slope of the lower curve at $\Theta = 29.6°$. Perfect two color achromatization over the entire scan range requires that the change of $R_{ij}$ be zero over the range of values $\Delta\Theta$ corresponding to the scan range $\Delta\alpha$.

The curves of FIG. 6 are plotted for one set of wavelengths, viz., 6328 Å, 5210 Å and 4416 Å. These curves will shift slightly if different wavelengths are chosen since the prism index n changes with $\lambda$.

Three Color Achromatization By Choice of Wavelengths

If the two circled points in FIG. 6 were vertically aligned, i.e., if both equations (6) and (7) were satisfied at a single $\Theta$ value, then at that value of $\Theta$, $M_i = \text{constant}/\lambda_i$, or $$M_1\lambda_1 = M_2\lambda_2 = M_3\lambda_3 = K \quad (8)$$

There are several ways this can be done. One way consists of choosing the third wavelength $\lambda'$ to fit the achromatization conditions of the other two wavelengths. For example, when equation (6) is satisfied, $R_{13} = 0.6979$ for $\lambda_3 = 4416$ Å and $\lambda_1 = 6328$ Å, and from FIG. 6, this is true at $\Theta = 29.6°$. However, for the $\Theta$ value 29.6°, $R_{23}' = 0.8050$ and does not satisfy equation (7) with $\lambda_2 = 5210$ Å.

We can use equation (7) to find a value for $\lambda_2'$ at $\Theta = 29.6°$. Letting $R_{23}' = 0.8050$ and $\lambda_3 = 4416$ Å, equation (7) can be solved for $\lambda_2'$; and we have $\lambda_2' = \lambda_3 R_{23}' = 5486$ Å. Thus, if $R_{23}$ did not change with $\lambda_2$, simply changing from $\lambda_2 = 5210$ Å to $\lambda_2' = 5486$ Å would accomplish three color achromatization. Of course, changing $\lambda_2$ does make a slight shift in the upper curve of FIG. 6 and thus an iterative process of solving for $\lambda_2'$, plotting $R_{23}'$, solving for a new $\lambda_2'$, etc., must be followed to approximate the correct value of $\lambda_2'$.

Three Color Achromatization By a Trimming Prism

Figure 7:
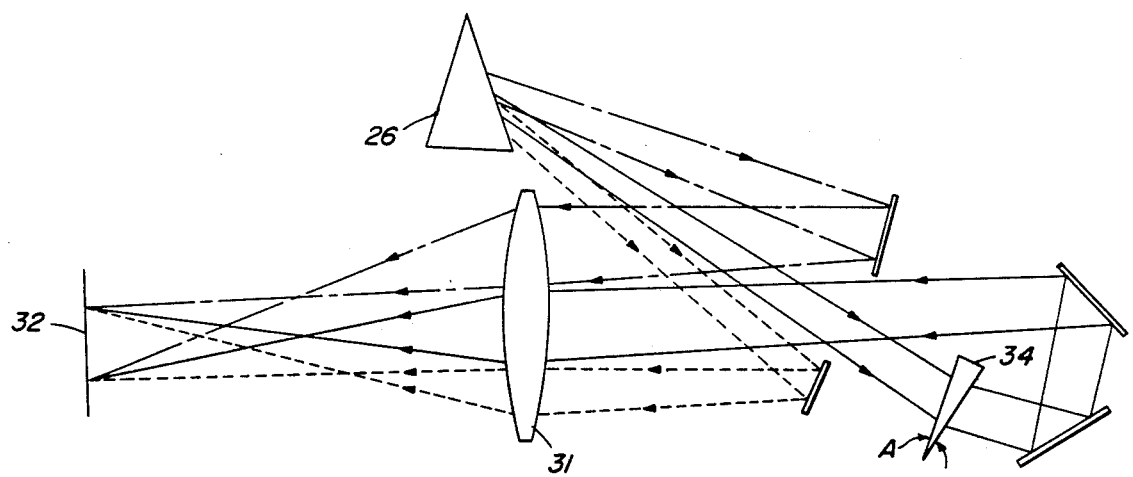
FIG. 7 is a schematic view of an optical achromatization system according to another preferred embodiment of the present invention.

Another technique, which does not require changing the wavelength of any beam, is shown in FIG. 7. A second "trimming" prism 34 has been used to compensate for the horizontal distance between the circled points in FIG. 6 by providing an additional control on the magnification for one wavelength. A prism operating near normal incidence ($\Theta = 0$) has a magnification $M_o$ given by $$M_o = \frac{\cos A}{(1 - n_i^2 \sin^2 A)^{\frac{1}{2}}} \quad (9)$$

Solving for apex angle A, $$A = \sin^{-1}\left(\frac{M_o^2 - 1}{M_o^2 n_i^2 - 1}\right)^{\frac{1}{2}} \quad (10)$$

Calculating as an example the value of A for a correcting prism needed in the example of FIG. 6, we remember that at $\Theta = 29.6°$ (the incident angle $\Theta$ which provides scan equalization for wavelengths $\lambda_1 = 6328$ Å and $\lambda_3 = 4416$ Å), the magnification ratio $R_{23}'$ must be 0.8050 to equalize the scan of a third wavelength $\lambda_2'$. For two color scan equalization with $\lambda_2 = 5210$ Å and $\lambda_3 = 4416$ Å it has been shown that $R_{23}$ must equal 0.8476.

Hence, we see that we can have three color scan equalization without changing the optical wavelengths (as was required by the technique of the preceding section) at $\Theta = 29.6°$ if $R_{23}$ is increased from 0.8050 to 0.8476. In doing so, $M_3$ cannot change because a change in the magnification of the $\lambda_3$ wavelength light scan angle would effect $R_{13}$ also. Therefore, only $M_2$ may be adjusted. The amount of adjustment in our example is determined by multiplying the magnification ratio 0.8050 by a factor which would bring it to 0.8476, or by 1.053. This can be accomplished by magnifying the scan angle of the $\lambda_2$ beam by 1.053 by placing a "trimming" prism of magnification $M_o = 1.053$ in the path of that beam.

If the same glass is used for both prisms 26 and 34 ($n_i$ in equation (10) equals 2.11493 at 5210 Å) then $$A = \sin^{-1}\left[\frac{(1.053)^2 - 1}{(1.053^2)(2.1149)^2 - 1}\right]^{\frac{1}{2}} = 9.54° \quad (11)$$

Thus, a trimming prism of apex angle equal to 9.54° in the path of the $\lambda_2$ beam would provide correct additional magnification of one wavelength.

The invention has been described in detail with particular reference to certain preferred embodiments thereof, but it will be understood that variations and modifications can be effected within the spirit and scope of the invention.

What is claimed is:

1. In apparatus including (1) an acoustooptic deflector cell, (2) variable frequency means for generating acoustic waves in said cell, and (3) means for impinging light of a plurality of different selected optical wavelengths upon said cell whereby said light of each selected optical wavelength will be diffracted through a scan angle proportional to its wavelength as the frequency of said generator means is varied; the improvement comprising:

a prism in the path of the diffracted light for magnifying the scan angle of light of each optical wavelength, said prism having an apex angle (1) equal to or greater than that minimum apex angle at which the absolute magnitude of scan angle magnification of said scan angles increases as the optical wavelength of light decreases and (2) less than that maximum angle at which light of the longest of said selected optical wavelengths is totally internally reflected in said prism.

2. In apparatus comprising (1) an acoustooptic diffraction cell in the path of light of different optical wavelengths $\lambda_1$ and $\lambda_2$ and (2) variable frequency means for generating acoustic waves in said cell, whereby light of wavelengths $\lambda_1$ and $\lambda_2$ will be diffracted through scan angles $\Delta\alpha_1$ and $\Delta\alpha_2$, respectively, said scan angles being proportional to the respective wavelength; the improvement comprising a prism in the path of the diffracted light, said prism:

having a surface upon which said diffracted light is incident;

being configured to differentially magnify said scan angles $\Delta\alpha_1$ and $\Delta\alpha_2$ by respective amounts $M_1$ and $M_2$; and being oriented such that the angle $\Theta$ between the incident light onto said surface and the normal to said surface is such that $M_1/M_2$ is substantially equal to the ratio of wavelengths $\lambda_2/\lambda_1$.

3. In apparatus comprising (1) an acoustooptic diffraction cell in the path of light of different optical wavelengths $\lambda_i = \lambda_1, \lambda_2, \ldots, \lambda_n$ and (2) variable frequency means for generating acoustic waves in said cell, whereby light of wavelengths $\lambda_i$ will be diffracted through scan angles $\Delta\alpha_i = \Delta\alpha_1, \Delta\alpha_2, \ldots, \Delta\alpha_n$, respectively, said scan angles being proportional to the respective wavelength; the improvement comprising a prism in the path of the diffracted light, said prism:

having a surface upon which said diffracted light is incident;

being configured to differentially change said scan angles $\Delta\alpha_i$ by respective amounts $M_i = M_1, M_2, \ldots, M_n$; and being oriented such that the angle $\Theta$ between the incident light onto said surface and the normal to said surface is such that $M_i\lambda_i$ is substantially constant.

4. In apparatus comprising (1) an acoustooptic diffraction cell in the path of light of different selected optical wavelengths $\lambda_1$, $\lambda_2$ and $\lambda_3$ and (2) variable frequency means for generating acoustic waves in said cell, whereby said light of each selected optical wavelength will be diffracted through a scan angle proportional to its wavelength; the improvement comprising:

a first prism oriented in the path of said diffracted light so as to change the scan angles of said light of wavelengths $\lambda_1$, $\lambda_2$ and $\lambda_3$ by respective extents $M_1$, $M_2$ and $M_3$ such that $M_1/M_2 = \lambda_2/\lambda_1$; and a second prism located in the path of the diffracted and magnified light of wavelength $\lambda_3$ and constructed and oriented such that the scan angle of light incident upon said second prism is remagnified by an amount $M_o$ such that $M_1/(M_3M_o)$ is approximately equal to $\lambda_3/\lambda_1$.

5. In an apparatus for deflecting a plurality of light beams of different predetermined optical wavelengths through substantially the same scan angle, such apparatus including acoustooptic means for deflecting each beam through a unique scan angle proportional to its wavelength, and optical achromatization means for equalizing the scan angles of the deflected beams, the improvement wherein said optical achromatization means comprises prism means having a surface which is positioned in the path of the deflected beams, said prism means being constructed to spatially separate the respective scan angles of said beams and to differentially magnify the scan angle of each beam by an amount that varies as an inverse function of the wavelength of each beam.

6. The apparatus defined by claim 5 wherein said prism means comprises a single prism having a surface positioned in the path of said deflected beams to intersect the beams at a predetermined angle of incidence, said prism having an apex angle and being constructed of a material having a different index of refraction for each of said predetermined wavelengths, said angle of incidence, apex angle and prism material being chosen such that the products of the scan angle magnifications by the prism and the wavelengths of the respective beams are equal.

7. The apparatus defined by claim 5 further comprising optical means, in the path of the spatially separated beams, for redirecting such beams in such a manner that the centers of the paths scanned by all the beams coincide at a predetermined focal plane.

8. The apparatus defined by claim 7 wherein said optical means comprises at least one mirror.

9. Apparatus for deflecting a plurality of light beams of different predetermined optical wavelengths through substantially the same scan angle, said apparatus comprising:

(a) a single acoustooptic cell positioned in the path of said light beams and adapted to deflect each beam through a scan angle dependent on the wavelength of such beam, the scan angle of one beam partially overlapping the scan angle of at least one other beam;

(b) prism means having a surface positioned in the path of light beams deflected by said acoustooptic cell, said prism means being so constructed and positioned relative to the deflected light beams to (1) spatially separate the deflected beams so that each beam is scanned through a scan angle which is spatially separated from the scan angle of the other beams, and (2) differentially magnify the scan angle of each beam by an amount that varies as an inverse function of the wavelength of each beam, whereby the scan angles of the respective beams are equalized; and (c) optical means for redirecting the spatially separated beams toward a common point at a predetermined plane.

* * * * *